April 29, 1952     B. J. COSNECK     2,594,609
SEPARABLE FASTENER
Filed Oct. 9, 1946
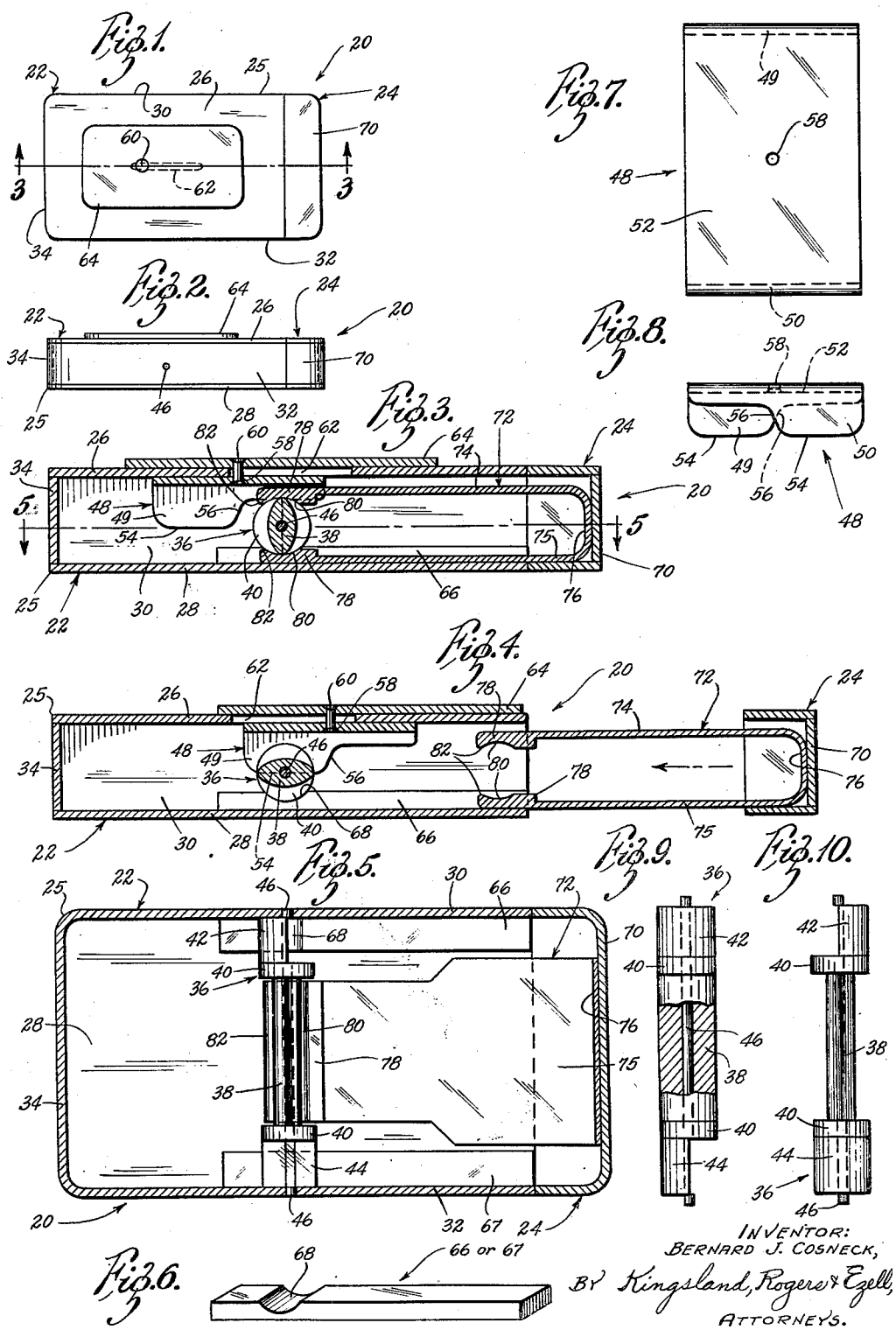
INVENTOR:
BERNARD J. COSNECK,
BY Kingsland, Rogers & Ezell,
ATTORNEYS.

Patented Apr. 29, 1952

2,594,609

UNITED STATES PATENT OFFICE 2,594,609

SEPARABLE FASTENER

Bernard J. Cosneck, St. Louis, Mo.

Application October 9, 1946, Serial No. 702,281

7 Claims. (Cl. 24—230)

The present invention relates generally to actuating and locking devices, and more particularly to a novel actuating and locking device capable of wide use, but which finds particular adaptation in securing jewelry, such as a necklace, bracelet, or the like.

An object of the present invention is to provide a novel locking mechanism which may be formed in miniature for adaptation in the jewelry field for securing bracelets, lockets, and the like.

Another object is to provide a novel locking device of wide use, which may be quickly and easily locked and which may be as quickly and easily unlocked.

Another object is to provide a novel locking device incorporating two units completely separable from each other in the unlocked stage of the device whereby the device is readily adapted to securing objects which require separation in the use thereof.

Another object is to provide a novel actuating and locking device capable of wide adaptation which incorporates two elements, one of which is both rotated and locked by the other.

Other objects are to provide a novel locking device which is simple in construction and inexpensive to fabricate, which is sturdy in construction, which is positive in its locking action so that the two locked elements thereof cannot be separated, which is adapted to give long service without the requirement of expensive maintenance, and which is easy to manipulate so that maximum use and efficiency can be obtained with minimum instruction.

Other objects and advantages, in addition to the foregoing, are apparent from the following description taken with the accompanying drawing, in which:

Fig. 1 is a top plan view of a locking device constructed in accordance with the teachings of the present invention;

Fig. 2 is a side elevational view thereof;

Fig. 3 is an enlarged cross-sectional view taken on the line 3—3 of Fig. 1, the associated locking elements being shown in locked relation;

Fig. 4 is a cross-sectional view similar to Fig. 3, but showing the locking elements in unlocked relation and the separable units apart;

Fig. 5 is a cross-sectional view taken on the line 5—5 of Fig. 3;

Fig. 6 is an isometric view of a guide member;

Fig. 7 is a plan view of an actuating member forming part of the present locking device;

Fig. 8 is a side elevational view of said actuating member;

Fig. 9 is a plan view of a rotatable member forming part of the present locking device, a portion being broken away to illustrate the shaft; and Fig. 10 is a plan view of the rotatable member of Fig. 9 rotated through 90° to the left.

Referring to the drawing more particularly by reference numerals, 20 indicates generally a locking device constructed in accordance with the concepts of the present invention. Broadly, the locking device 20 includes two separable units 22 and 24, which, in one relation of the elements thereof, are securely locked against separation and which, in another relation of the elements thereof, may be readily and freely separated. Each of the units 22 and 24 may be secured to a free end of a necklace, bracelet, or the like, when the device is used as a jewelry lock.

The unit 22 includes a rectangular casing or base 25 formed of opposed wide sides 26 and 28, opposed narrow sides 30 and 32, and an end 34. The casing 25 is open at the end opposed to the end 34.

Within the casing 25 and rotatably mounted in the sides 30 and 32 is a member 36 of the configuration clearly shown in Figs. 9 and 10. The rotatable member 36 includes a central portion 38 of oval cross section, end portions 40 of the circular cross section, and end portions 42 and 44 of semicircular cross section, the semicircular cross sections 42 and 44 being 90° out of phase in respect to each other. A mounting shaft 46 extends through the rotatable member 36 centrally thereof, being cut away for the extent of each of the end portions 42 and 44, as is shown in Figs. 9 and 10. If desired, stub shafts, or the like, may replace the shaft 46. As is clear from Figs. 2 through 4, the rotatable member 36 is mounted below the center line of the casing. However, this relationship may be varied as desired, and the cross sections of the central portion 38 and of the end portions 42 and 44 may be varied within wide operating limits.

Also mounted within the casing 25 of the unit 22 is an actuating member 48 (Figs. 7 and 8). The actuating member 48 includes side portions 49 and 50 and a joining web portion 52. Each of the side portions 49 and 50 has the free edge thereof formed as shown in Fig. 8 to include a horizontal edge portion 54 and a concave convex edge portion 56. Centrally of the web portion 52 is an aperture 58 which receives a peened-over rivet 60 (Figs. 3 and 4), the rivet 60 extending through a slot 62 in the side 26 of the casing 25 and being similarly secured in a suitable opening formed centrally in an operating member 64 disposed against the outer surface of the side 26. It is manifest that reciprocal movement of the externally disposed operating member 64 imparts the same reciprocal movement to the actuating member 48.

As is clear from the drawing, the actuating member 48 is located in respect to the rotatable member 36 so that the side portion 49 of the former is adjacent the end portion 42 of the latter, and the side portion 50 of the former is adjacent the end portion 44 of the latter. When the horizontal edge portion 54 of the side portion 49 is in engagement with the flat surface of the end portion 42, as is shown in Fig. 4, the end portion 44 of the rotatable member 36 will be disposed with the flat surface facing the concave convex edge 56 of the side portion 50. Movement of the operating member 64 to the left will move the edge portion 54 of the side portion 49 out of engagement with the flat surface of the end portion 42 and will engage the concave convex edge portion 56 of the side portion 50 with the flat surface of the end portion 44, which will effect a rotation of the rotatable member 36 from the position shown in Fig. 4 to the position shown in Fig. 3, the horizontal edge portion 54 of the side portion 50 being in engagement with the flat surface of the end portion 44 in this latter position.

Spaced guide straps 66 and 67 are secured to the inner surface of the side 28 of the casing, or are formed integral therewith. Each guide strap 66 and 67 includes an arcuate portion 68 to accommodate the end portions 42 and 44 of the rotatable member 36.

The other unit 24 includes an elongated cup-shaped base 70 formed to close the open end of the casing 25 of the unit 22. A U-shaped element 72 comprising legs 74 and 75 and a bight 76 is secured as by welding or soldering in the base 70. The U-shaped element 72 is rigidly formed, so that there is no movement of the ends of the legs 74 and 75 towards and away from each other, although these legs 74 and 75 may be formed of resilient material for particular adaptations. A member 78 having an arcuate channel 80 of a radius substantially equal to the major radius of the oval central portion 38 of the member 36 therein is secured to or formed integral with the free end of each of the legs 74 and 75, extending across the full width thereof. Where resilient legs 74 and 75 are used, the cross section of channel 80 may be varied to any particular cross section desired. The free ends of the legs 74 and 75 and the free edges of the members 78 are rounded as is indicated at 82.

The locking action of the locking device 20 is clear from the foregoing description taken with the accompanying drawing, but a brief summary thereof is in order. Assuming that the two units 22 and 24 are separated, to lock the two units against separation, the operating member 64 of the unit 22 is disposed as shown in Fig. 4, which is its right-hand position when the unit 22 is viewed in the drawing, which disposes the oval-shaped center portion 38 of the rotatable member 36 with the major diameter parallel with the sides 26 and 28 of the casing 25 of the unit 22. Holding the unit 24 and the unit 22 in the positions shown in Fig. 4, the element 72 is telescoped into the casing 25 of the unit 22 until the edges of the base 70 engage the free edges of the sides 26, 28, 30 and 32 of the casing of the unit 22. Thereupon, the operating member 64 is moved from its position of Fig. 4 to its position of Fig. 3, which effects a 90° rotation of the rotatable member 36, as aforedescribed, thereby disposing the major diameter of the oval portion 38 of the rotatable member 36 at right angles to the sides 26 and 28 and engaging the narrow ends thereof with the arcuate channels 80 of the members 78 of the legs 74 and 75 of the element 72. The leg 75 is thereby securely pressed against the inner surface of the side 28 of the casing 25 of the unit 22, and the channels 80 of both members 78 are engaged by the oval portion 38 of member 36, which positively prevents separation of the unit 24 from the unit 22. Friction maintains the operating member 64 in either of its limit of movement positions. To unlock the device 20, the foregoing procedure is reversed.

It is apparent that there has been provided a locking device which fulfills all the objects and advantages sought therefor.

It is to be understood that the foregoing description and the accompanying drawing have been given by way of illustration and example. The present locking device finds wide adaptation, although the disclosed embodiment finds particular use in the jewelry field.

It is also to be understood that changes in form of the elements, rearrangement of parts, and substitution of equivalent elements, which will be obvious to those skilled in the art, are contemplated as within the scope of the present invention, which is limited only by the claims which follow.

What is claimed is:

1. In a locking device, in combination, a first unit including a casing, a member mounted in said casing for rotation, an actuating member mounted in said casing adjacent said rotatable member for limited reciprocative movement, said rotatable member and said actuating member including cooperatively engageable portions whereby reciprocation of said actuating member in one direction rotates said rotatable member through a fraction of a revolution and reciprocative movement of said actuating member in the opposite direction rotates said rotatable member a fraction of a revolution in the opposite direction, means for reciprocating said actuating member, and a second unit including an element having means adapted to be engaged by said rotatable member in one position of said member and adapted to be free of said rotatable member in the other position of said member, said second unit being secured to said first unit against separation when the element of the second unit is engaged by the rotatable member of the first unit and said second unit being free for separation from said first unit when said element of the second unit is free from said rotatable member of the first unit.

2. In a locking device, in combination, two separable units, said units when engaged against separation comprising a closed casing, and means releasably securing said units against separation including a rotatable member connected to one of said units having a cam portion, said second unit including a member disposed adjacent said rotatable member and secured against the inner wall of the casing by the cam portion of said rotatable member when said rotatable member is in one position and being removable from relationship with the rotatable member when said cam portion of said rotatable member is in another position of rotation, and reciprocally slidable means for rotating said rotatable member.

3. In a locking device, in combination, two units, one unit including a base, a member supported by said base for rotation, an actuating member supported by said base for limited reciprocative movement in operative relation to said rotatable member, said rotatable member including surfaces alternatively engageable by said actuating member in the reciprocative movement of said actuating member whereby said rotatable member is rotated first in one direction and then in the opposite direction, and the other unit including an element engageable by said rotatable member in one position of said member to lock said two units against separation, said element being free of said rotatable member in the other position of said member permitting separation of said units.

4. In a device of the kind described, a base, a member supported by said base for rotation, and an actuating member supported adjacent said rotatable member for two-way movement, said rotatable member having axially spaced surfaces of like contour, said actuating member including spaced surfaces adapted to alternately engage said surfaces of said rotatable member, said actuating member surfaces being so formed that one surface is effective to engage its opposed rotatable member surface to rotate said rotatable member in one direction and to lock it in said position and the other surface is effective to engage its opposed rotatable member surface to rotate said rotatable member in the other direction and to lock it in said position.

5. In a locking device, in combination, two units adapted to be moved towards and from each other, and means for releasably securing said units together including a member connected to one unit rotatable through a selected predetermined fraction of one revolution between two limits of rotation and means for rotating said member between said limits, said rotating means including integral means for securing said rotatable member against rotation in its two limit positions of rotation, and an element connected to said other unit engaged by said rotatable member in one limit position of said member to secure said units against separation, said element being free of said member in the other limit position of said member.

6. In a locking device, in combination, a first unit including a casing, a member mounted in said casing for rotation, an actuating member mounted in said casing adjacent said rotatable member for limited reciprocative movement, said rotatable member and said actuating member including cooperatively engageable portions whereby reciprocation of said actuating member in one direction rotates said rotatable member through a fraction of a revolution and locks it in said position, and reciprocative movement of said actuating member in the opposite direction rotates said rotatable member a fraction of a revolution in the opposite direction and locks it in said position, means for reciprocating said actuating member, and a second unit including an element having means adapted to be engaged by said rotatable member in one position of said member and adapted to be free of said rotatable member in the other position of said member, said second unit being secured to said first unit against separation when the element of the second unit is engaged by the rotatable member of the first unit and said second unit being free for separation from said first unit when said element of the second unit is free from said rotatable member of the first unit.

7. In combination, a locking device including two separable units, one of said units including a base, a member rotatably mounted thereon having an oval center portion and semi-cylindrical end portions, a slidable member mounted on said base adjacent said rotatable member and having side portions spaced for engagement with said end portions thereof, said side portions having edges formed with a convex portion and a straight portion, said convex edge portions being adapted to alternately engage said end portions to rotate said rotatable member and said straight edge portions to lock said rotatable member in the rotated position, the other of said units including an element engageable by the oval portion of said rotatable member in one locked position thereof to lock said units together, said element being free of said oval portion in the other locked position thereof.

BERNARD J. COSNECK.

REFERENCES CITED

The following references are of record in the file of this patent:

UNITED STATES PATENTS

| Number | Name | Date |
|---|---|---|
| 2,013,283 | Merrill | Sept. 3, 1935 |
| 2,459,223 | Henderson | Jan. 18, 1949 |

FOREIGN PATENTS

| Number | Country | Date |
|---|---|---|
| 354,084 | Great Britain | Aug. 6, 1931 |
| 390,528 | France | Oct. 7, 1908 |